UNITED STATES PATENT OFFICE.

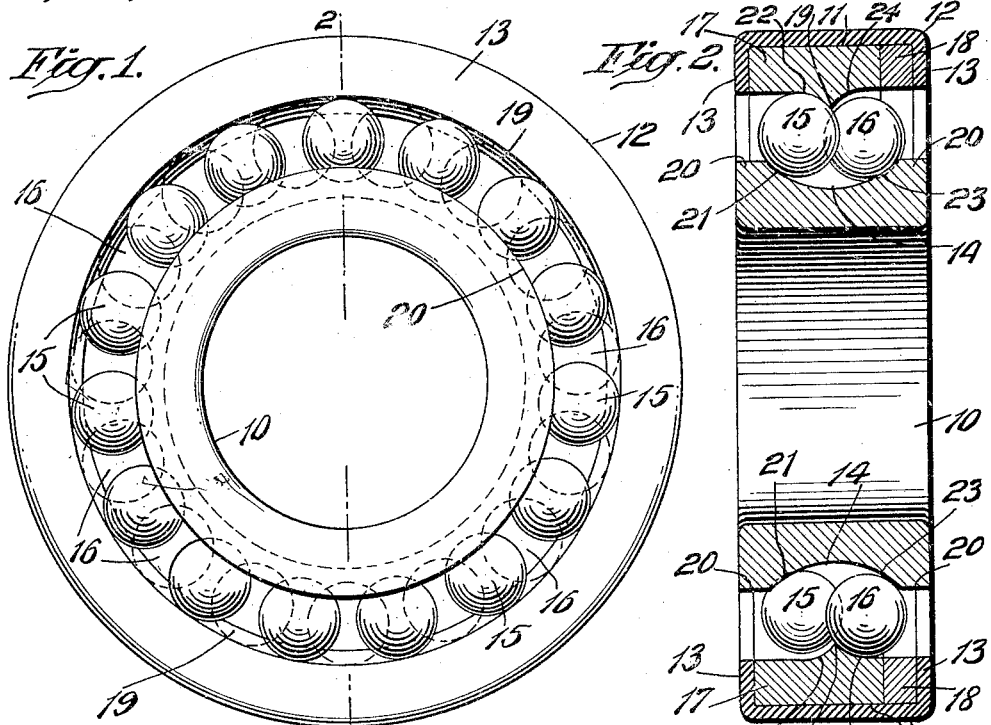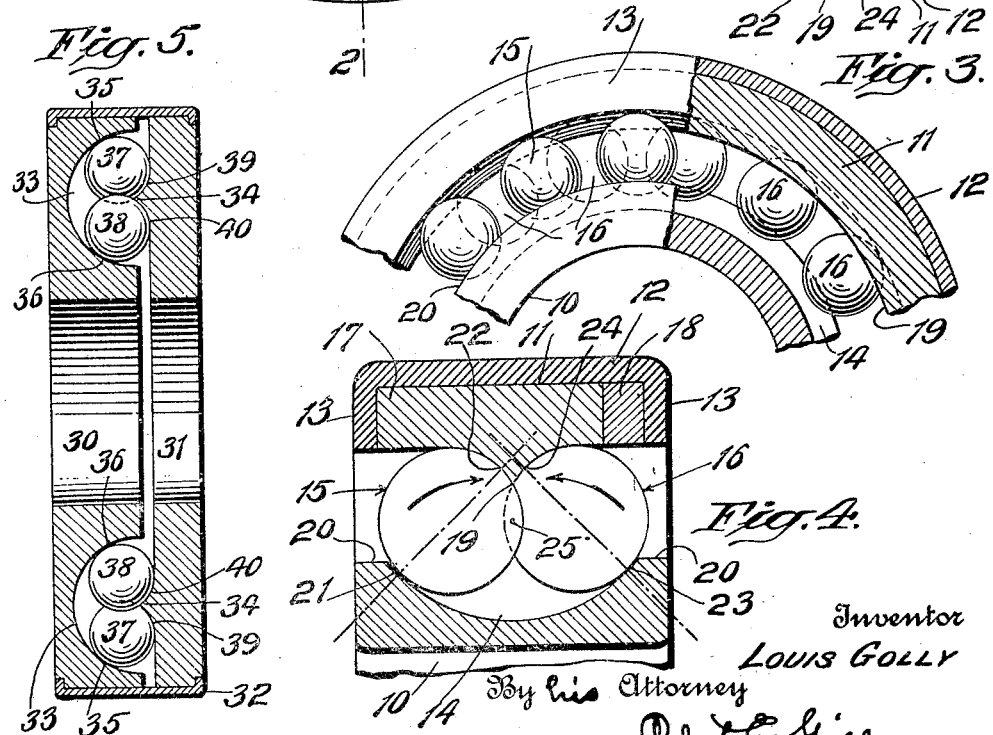

LOUIS GOLLY, OF BROOKLYN, NEW YORK, ASSIGNOR OF FIFTY-ONE PER CENT. TO ANDREW ALBRIGHT, JR., OF NEW YORK, N. Y.

BEARING.

1,346,121.          Specification of Letters Patent.      Patented July 13, 1920.

Application filed May 9, 1916. Serial No. 96,270.

*To all whom it may concern:*

Be it known that I, LOUIS GOLLY, a citizen of the United States, and a resident of Brooklyn, in the county of Kings and State of New York, have invented certain new and useful Improvements in Bearings, of which the following is a specification.

The invention resides in ball-bearings comprising two facing bearing members inclosing between them two series of balls adapted to raceways formed between said members, said members being of special configuration and the structure as a whole possessing marked advantages, as hereinafter explained. I may embody my invention in ball bearings of the type adapted to sustain radial loads and also in thrust bearings, in either event the structure as a whole being one of great durability and efficiency and capable of use with the creation of the minimum amount of friction. When the ball bearing members are concentric, one within the other, the outer member will preferably be formed in two specially constructed sections which will be connected together by an exterior ring or band whose opposite edges will lap inwardly upon the edges of said outer member. One special feature of my invention pertains to the durability of the bearing structure, with ease of assembly of the parts thereof, and a further important feature of my invention resides in the fact that I employ two sets of balls arranged in staggered order with respect to each other, each ball in one set normally, when the parts are at rest, contacting with two balls of the adjacent set and also having two special points of contact with the raceways, each ball in each set thus having when the parts are in a state of rest four points of contact but having in the progressive action of the movable parts of the bearing when in use, three points of contact, two being against the raceways on diagonal lines through the balls and the other being the contact of the balls in one set against the balls in advance in the other set. In carrying out my invention I so construct the raceways that the contacts of the balls therewith are at special points causing the balls to roll toward each other and in an outwardly direction on converging angles of substantially forty-five degrees from a given line extending through the bearing structure. The special disposition of the two sets of balls in the bearing of my invention so that they may roll toward each other and outwardly, I regard of great importance in that thereby the bearing as a whole becomes of great efficiency and the relative movements of the parts thereof are with the minimum of friction, wear and noise.

My invention will be fully understood from the detailed description hereinafter presented, reference being had to the accompanying drawings, in which:

Figure 1 is a side elevation of a bearing constructed in accordance with and embodying the invention;

Fig. 2 is a central vertical section through the same, taken on the dotted line 2—2 of Fig. 1;

Fig. 3 is a side elevation, partly in section, of a portion of the bearing illustrated wholly in side elevation, in Fig. 1;

Fig. 4 is a transverse section through a portion of the bearing, on a larger scale, and being diagrammatic for the purpose of more clearly illustrating the contacts of the opposite balls with each other and with the raceways, and Fig. 5 is a central transverse section through a thrust bearing embodying features of my invention.

In the drawings, referring to Figs. 1 to 4 inclusive, 10 designates the inner cylindrical member of the bearing, 11 the outer bearing member concentric with and encompassing said inner member, and 12 a metal band closely engaging said outer member 11 and having edge flanges 13 lapping upon the sides of the same. The inner member 10 contains the usual bore and in its outer peripheral face is formed with the commodious continuous concavity or annular groove 14 whose opposite side portions serve as bearings or seats for the balls of the respective sets which I number 15, 16. The balls 15, 16 do not bear against the bottom of the groove 14, but against the curved inclined outer facing portions of the walls defining said groove. The bearing member 10 is preferably in one integral piece and of ring form, as shown.

The outer bearing member 11 is shown as formed of two matching sections 17, 18 which together form the member. The section 17 is greater in width than the section 18 and it is formed at the vertical center of the bearing structure with an annular inwardly projecting rib 19 having curved side portions which afford bearing-seats for the balls 15, 16. The section 18 of the outer bearing member 11 is of ring formation and when applied to the section 17 completes the outer bearing member. The sections 17, 18 are held in rigid relation to each other, side by side, by means of the external band 12 hereinbefore referred to, one edge portion of which is after the section 18 has been applied to position, pressed inwardly against the outer side of said section, thereby forming a flange 13 which locks the section 18 in position and coöperates with the opposing flange 13 to effectually bind the sections 17, 18 in rigid relation to each other. The outer bearing member 11 is slightly less in width than the inner bearing member 10, but when the band 12 has been applied to the bearing member 11, the thickness of its flanges 13 gives to the peripheral portion of the structure the same width as that of the inner bearing member 10.

The peripheral edge portions 20 of the inner bearing member 10 are spaced from the facing inner portions of the outer bearing member 11 and flanges 13 by spaces which are less in width than the diameter of the balls 15, 16, and hence during the employment of the bearing said balls cannot escape from between the bearing members.

In assembling the parts of the bearing the set of balls 15 may be placed in the annular groove 14 and the section 17 of the outer bearing member, with the band 12 thereon and flanged at one edge against the same, inserted from the right, looking at Figs. 2 and 4, over said balls 15 and thereupon the balls 16 may be inserted in place, and after this has been done the bearing section 18 will be applied to position and the right hand edge portion of the band 12 turned inwardly against the same and to constitute the right hand flange 13, as the same appears in Figs. 2 and 4. I do not confine my invention to any special method of assembly of the parts of the bearing, since such assembly may be accomplished in several ways. A convenient method of introducing the balls 16 to position is by forming a small concave recess, not shown, in the inner right hand corner edge, looking at Figs. 2 and 4 of the section 17, to facilitate the forcing in of the balls, one at a time, over the adjacent peripheral portion 20 of the ring member 10 and into the groove 14 of said member. I introduce the same number of balls 16 as there are balls 15, and the balls 16 are entered partly between and engage the balls 15 and separate said balls 15 as far as may be necessary from each other, and the balls 15 enter partly between and engage the balls 16 and separate said balls 16 as far as may be necessary from each other, the usual separator plates or the like for the balls of a ball bearing being wholly absent from the bearing of my invention. The concave recess to which I have referred above is a known expedient in this art for facilitating the introduction of the balls of a ball-bearing between the two main members of the bearing. I have also found that I may omit said concave recess and introduce the balls 16 when the section 17 has been expanded by immersion in hot oil. The two sets of balls 15, 16 will be arranged in staggered order and each ball of one set will engage two balls of the opposing set.

The special formation of the bearing members 10, 11 is important in carrying out the purposes of my invention. It is important in one form of the invention that the outer bearing member 11 be composed of the sections 17, 18, with the section 18 very much less in width than the section 17 so that both sets of balls may bear against the section 17 and also so that the parts may be readily assembled and the balls prevented thereafter from escaping from between the bearing members. A very essential advantage derived from the special formation of the facing portions of the bearing members 10, 11 is that each ball of one set has a contact point at 21 with the bearing member 10 and at 22 with the bearing member 11 and that each ball of the other set has a similar contact point at 23 with the bearing member 10 and at 24 with the member 11, these contact points being diagonally opposite to each other and on a line standing at about forty-five degrees to the horizontal. The special formation and arrangement of the parts of the bearing also creates a further bearing point, indicated at the dot 25, of each ball in one set against the ball in advance of it in the adjoining set. During the use of the bearing each ball has three progressive points of contact, one being against the bearing member 10, another against the bearing member 11 and the third at the dot 25 against the ball in advance of it. It is one of the purposes of my invention to employ plural sets of balls so housed or confined that each ball of each set may during the use of the bearing have the three points of contact I have just referred to, and the result of this arrangement is that the balls do not roll on a horizontal axis, but have a special rolling motion outwardly and toward each other in the manner I have attempted to indicate by arrows in Fig. 4 and approximately on the converging angular lines indicated in Fig. 4. The peculiar rolling action of the balls attained by me results in the creation of the minimum amount of friction between the moving surfaces and in a smoothness of action which greatly increases the desirability, efficiency and lasting qualities of the bearing.

In the modification shown in Fig. 5, which illustrates a thrust bearing, 30, 31 designate the two bearing members and 32 indicates an exterior metal band by which said members are properly secured together. The members 30, 31 have a plain bore, as shown, and the member 30 is formed with an annular groove 33 corresponding with the groove 14 of the member 10 shown in Fig. 2. The member 31 is formed with an annular rib 34 which projects outwardly in a direction toward said groove 33 and is central thereof, and said rib corresponds with the rib 19 shown in Fig. 4. The opposite side walls of the groove 33 afford bearing points 35, 36 for the respective sets of balls 37, 38, and the bearing member 31 at opposite sides of the rib 34 afford bearing or contact points 39, 40 for said balls 37, 38, respectively, as will be readily understood from an inspection of Fig. 5 in view of the explanations that have already been made with regard to the construction shown in Figs. 1 to 4 inclusive. The two sets of balls 37, 38 are arranged one within the line of the other and are in staggered order, one ball of one set being entered partly between two adjacent balls of the other set, and during the use of the structure each ball in one set has a contact with the ball in advance of it in the other set in the same manner that I have explained with respect to the contact point 25 indicated in Fig. 4. In Fig. 5 therefore the balls have the three point contact arrangement shown in Figs. 1 to 4 inclusive, except that in the case of a thrust-bearing said balls instead of being arranged side by side horizontally as in Fig. 2, will be arranged side by side on concentric lines or so that one set is within the outline of the other, as shown in Fig. 5. In the case of the thrust-bearing one member of the bearing must have rotary motion, and hence in the construction shown in Fig. 5 I secure the band 32 rigidly to one member and allow freedom for the other member to rotate therein. In the construction presented I prefer to secure the band 32 rigidly to the member 30, since the member 30 is wider than the member 31 and less friction is created when the member 31 is made the rotary member, it presenting a smaller surface to the band 32 than the member 30 would if said band were rigidly fastened to the member 31 and the member 30 were permitted to rotate. The method of arranging the band 32 is however a detail which may well be left to the will or desire of the manufacturer.

The method of employing the bearings shown in Figs. 1 to 5, respectively, will be understood without further detailed explanation. In each construction the three point contact feature is attained and in each instance there are two sets of balls arranged in staggered order with the individual balls of one set entered partly between and held in close engagement with two balls of the adjacent set, and said sets of balls being side by side either on parallel circles or on concentric circles, as shown.

I do not limit my invention to all of the details of form, construction and arrangement shown, since I am aware that changes may be made in the details well within the scope and spirit of my invention as claimed. I illustrate two forms of the invention, but obviously other forms will suggest themselves in view of what has been explained hereinbefore.

What I claim as my invention and desire to secure by Letters Patent, is:

1. A bearing of the character described comprising two bearing members having facing surfaces affording raceways, and two sets of balls engaging said raceways and being parallel with each other and in staggered order with the balls of one set entered partly between and engaging the balls of the adjacent set, the raceways of one of said members being diagonally disposed with respect to the raceways of the other member whereby said balls, while normally having four points of contact, during the progressive action of the movable parts of the bearing are given three points of contact, two for each ball being against its raceways on a diagonal line through the ball and one being the contact of the balls in one set against the balls in advance in the other set, and whereby said balls of each set in the operation of the bearing and when the driven main member thereof is turning forwardly or counter-clockwise are caused to roll toward and against the balls in the other set and in an outwardly direction on angular lines.

2. A bearing of the character described comprising two bearing members having facing surfaces affording raceways, two sets of balls engaging said raceways and arranged in staggered order with the balls of one set entered partly between and engaging the balls of the adjacent set, and means confining said bearing members, one of said members having in its face an annular groove affording at its opposite side walls two of said raceways and the other of said members having centrally of said groove and projecting toward the same an annular rib affording at the sides thereof the other two raceways, whereby the raceways of one of said members become diagonally disposed with respect to the raceways of the other member and whereby said balls, while normally having four points of contact, during the progressive action of the movable parts of the bearing are given three points of contact, two being against the raceways on diagonal lines through the balls and the other being the contact of the balls in one set against the balls in advance in the other set, and whereby said balls of each set in the operation of the bearing and when the driven main member thereof is turning forwardly or counter-clockwise are caused to roll toward and against the balls in the other set and in an outwardly direction on angular lines.

3. A bearing of the character described comprising two concentric bearing members having facing surfaces affording raceways, and two sets of balls engaging said raceways and arranged in staggered order with the balls of one set entered partly between and engaging the balls of the adjacent set, one of said members having in its face an annular groove affording at its opposite side walls two of said raceways and the other of said members having centrally of said groove and projecting toward the same an annular rib affording at the sides thereof the other two raceways, whereby the raceways of one of said members become diagonally disposed with respect to the raceways of the other member, and whereby said balls while normally having four points of contact, during the progressive action of the movable parts of the bearing are given three points of contact, two being against the raceways on diagonal lines through the balls and the other being the contact of the balls and the other being the contact of the balls in one set against the balls in advance in the other set, and whereby said balls of each set in the operation of the bearing and when the driven main member thereof is turning forwardly or counter-clockwise are caused to roll toward and against the balls in the other set and in an outwardly direction on angular lines.

4. A bearing of the character described comprising two concentric bearing members having facing surfaces affording raceways, one of said members being in two matching circular sections, a band engaging the exposed surface of said sections and flanged against the sides thereof for binding said sections together, and two sets of balls engaging said raceways and arranged in staggered order with the balls of one set entered partly between and engaging the balls of the adjacent set, one of said members having in its face an annular groove affording at its opposite side walls two of said raceways and the other of said members having centrally of said groove and projecting toward the same an annular rib affording at the sides thereof the other two raceways, whereby the raceways of one of said members become diagonally disposed with respect to the raceways of the other member, and whereby said balls, while normally having four points of contact, during the progressive action of the movable parts of the bearing are given three points of contact, two being against the raceways on diagonal lines through the balls and the other being the contact of the balls in one set against the balls in advance in the other set, and whereby said balls of each set in the operation of the bearing and when the driven main member thereof is turning forwardly or counter-clockwise are caused to roll toward and against the balls in the other set and in an outwardly direction on angular lines.

5. A bearing of the character described comprising two concentric bearing members having facing surfaces affording raceways, and two sets of balls engaging said raceways and arranged in staggered order with the balls of one set entered partly between and engaging the balls of the adjacent set, the inner of said members having in its face an annular groove affording at its opposite side walls two of said raceways and the outer of said members having centrally of said groove and projecting toward the same an annular rib affording at the sides thereof the other two raceways, whereby the raceways of one of said members become diagonally disposed with respect to the raceways of the other member, and whereby said balls, while normally having four points of contact, during the progressive action of the movable parts of the bearing are given three points of contact, two being against the raceways on diagonal lines through the balls and the other being the contact of the balls in one set against the balls in advance in the other set, and whereby said balls of each set in the operation of the bearing and when the driven main member thereof is turning forwardly or counter-clockwise are caused to roll toward and against the balls in the other set and in an outwardly direction on angular lines.

6. A bearing of the character described comprising two concentric bearing members having facing surfaces affording raceways, and two sets of balls engaging said raceways and arranged in staggered order with the balls of one set entered partly between and engaging the balls of the adjacent set, the inner of said members having in its face an annular groove affording at its opposite side walls two of said raceways, and the outer of said members having centrally of said groove and projecting toward the same an annular rib affording at the sides thereof the other two raceways, whereby the raceways of one of said members become diagonally disposed with respect to the raceways of the other member, and whereby said balls, while normally having four points of contact, during the progressive action of the movable parts of the bearing are given three points of contact, two being against the raceways on diagonal lines through the balls and the other being the contact of the balls in one set against the balls in advance in the other set, and said outer member being formed of two matching circular sections, one of which is wider than the other and affords said rib with the raceways at the sides thereof.

7. A bearing of the character described comprising two concentric bearing members having facing surfaces affording raceways, and two sets of balls engaging said raceways and arranged in staggered order with the balls of one set entered partly between and engaging the balls of the adjacent set, the inner of said members having in its face an annular groove affording at its opposite side walls two of said raceways, and the outer of said members having centrally of said groove and projecting toward the same an annular rib affording at the sides thereof the other two raceways, whereby the raceways of one of said members become diagonally disposed with respect to the raceways of the other member, and whereby said balls, while normally having four points of contact, during the progressive action of the movable parts of the bearing are given three points of contact, two being against the raceways on diagonal lines through the balls and the other being the contact of the balls in one set against the balls in advance in the other set, and said outer member being formed of two matching circular sections, one of which is wider than the other and affords said rib with the raceways at the sides thereof, combined with an encompassing band on said outer bearing member having its edges flanged over upon the sides of said member for binding the sections thereof together, the spaces at the sides of the bearing between said inner and outer bearing members being less than the diameter of said balls.

8. A bearing of the character described comprising two bearing members having facing surfaces each affording two raceways, and two sets of balls engaging said raceways and being parallel with each other and in staggered order with the balls of one set entered partly between and engaging the balls of the adjacent set, the raceways of one of said members being more widely separated from each other than the raceways of the other member, whereby the balls are caused to engage the raceways on diagonal lines convergingly extending from the more widely separated raceways to the more closely arranged raceways, and whereby also said balls, while normally having four points of contact, during the progressive action of the movable parts of the bearing are given three points of contact, two for each ball being against its offset raceways and one being the contact of the balls in one set against the balls in advance in the other set, and whereby said balls of each set in the operation of the bearing and when the driven main member thereof is turning forwardly or counter-clockwise are caused to roll toward and against the balls in the other set and in an outwardly direction on angular lines.

9. A bearing of the character described comprising two concentric bearing members having facing surfaces each affording two raceways, and two sets of balls engaging said raceways and being parallel with each other and in staggered order with the balls of one set entered partly between and engaging the balls of the adjacent set, the raceways on the inner member being more widely separated from each other than the raceways on the outer member, whereby the balls are caused to engage the raceways on diagonal lines convergingly extending from the more widely separated raceways to the more closely arranged raceways, and whereby also said balls, while normally having four points of contact, during the progressive action of the movable parts of the bearing are given three points of contact, two for each ball being against its offset raceways and one being the contact of the balls in one set against the balls in advance in the other set, and whereby said balls of each set in the operation of the bearing and when the driven main member thereof is turning forwardly or counter-clockwise are caused to roll toward and against the balls in the other set and in an outwardly direction on angular lines.

Signed at New York city, in the county of New York and State of New York, this 8th day of May, A. D. 1916.

LOUIS GOLLY.

Witnesses:
ARTHUR MARION,
CHAS. C. GILL.